O. W. TOLLSTAM.
ENGRAVER'S PLATE PRESS.
APPLICATION FILED JULY 18, 1908.

1,188,704.

Patented June 27, 1916.
6 SHEETS—SHEET 1.

Fig.1

Witnesses:
Wm. Geiger
H. W. Munday

Inventor:
Oscar W. Tollstam
By Munday, Evarts, Adcock & Clarke.
Attorneys

O. W. TOLLSTAM.
ENGRAVER'S PLATE PRESS.
APPLICATION FILED JULY 18, 1908.

1,188,704.  Patented June 27, 1916.
6 SHEETS—SHEET 5.

Witnesses:
Wm. Geiger
H. W. Munday

Inventor:
Oscar W. Tollstam
By Munday, Evarts, Adcock & Clarke,
Attorneys

O. W. TOLLSTAM.
ENGRAVER'S PLATE PRESS.
APPLICATION FILED JULY 18, 1908.

1,188,704.

Patented June 27, 1916.
6 SHEETS—SHEET 6.

Witnesses:
Wm. Geiger
H. W. Munday

Inventor:
Oscar W. Tollstam
By Munday, Evarts, Adcock & Clarke.
Attorneys

THE COLUMBIA PLANOGRAPH CO., WASHINGTON, D. C.

UNITED STATES PATENT OFFICE.

OSCAR W. TOLLSTAM, OF CHICAGO, ILLINOIS.

ENGRAVER'S PLATE-PRESS.

1,188,704.
Specification of Letters Patent. Patented June 27, 1916.

Application filed July 18, 1908. Serial No. 444,200.

*To all whom it may concern:*

Be it known that I, OSCAR W. TOLLSTAM, a citizen of the United States, residing in Chicago, in the county of Cook and State of Illinois, have invented a new and useful Improvement in Engravers' Plate-Presses, of which the following is a specification.

My invention relates to power printing-presses for taking impressions from engraved steel or copper plates, and has for a primary object the production of a power press that shall combine, in its automatic operation, all of the several functions of mechanically inking and wiping and polishing and printing from the engraved plate, without the intervention of any manual operation; and the invention has for its further objects the effecting of such other improvements in structure or function as may be found to obtain in the mechanism as hereinafter described or claimed.

In the accompanying drawing, forming a part of this specification, and in which similar numerals of reference indicate like parts in all the figures.

The source of power may be a motor 20, whose shaft-pinion 21 meshes with the idle gear 22 that in turn meshes with the pinion 23 on the main driving shaft 24. This pinion 23 in turn meshes with the gear 25 on the forward end of the secondary driving shaft 26, which gear is radially slotted, at 27, to receive the stud 28 on which is pivoted the drive-rod 29 whose other end carries the reciprocally shifted gear wheel 30. Said gear wheel 30 meshes with the underneath stationary rack 31, fixed to the base plate of the machine, and with the upper rack 32 fixed to the underside of the impression roller frame 33, and the combined reciprocation and oscillation of said gear imparts to said impression roller frame the reciprocatory movement whereby the impression roller 34 is brought into pressure contact with the underside of the support or platen 35 upon which the paper or card to be printed is supported. The said reciprocal movement of the impression roller is timed to coincide with the dwell of the press-bed at the forward end of the latter's reciprocation, to be presently described. And such reciprocal movement of the impression roller frame is facilitated by the double series of roller bearings 36, 36 on which said frame rests. The impression roller is mounted in movable bearing plates and may be adjusted, to varying contact with the underside of the platen, by means of the wedge cams 37, 37 shifted by the adjustment screws 38, 38. The topmost peripheral line of said impression roller must always be adjusted to a high enough level to force the platen, and its supported paper or card, into the requisite position contact with the engraved plate, to effect the printing impression. And the re-reciprocal movement of the impression roller during the impression period causes the printing pressure to be exerted upon continuously successive transverse lines of the plate, instead of being simultaneously distributed over the whole surface of said plate, so that a minimum upward pressure of the impression roller is enabled to effect the entire printing impression.

Figure 1:
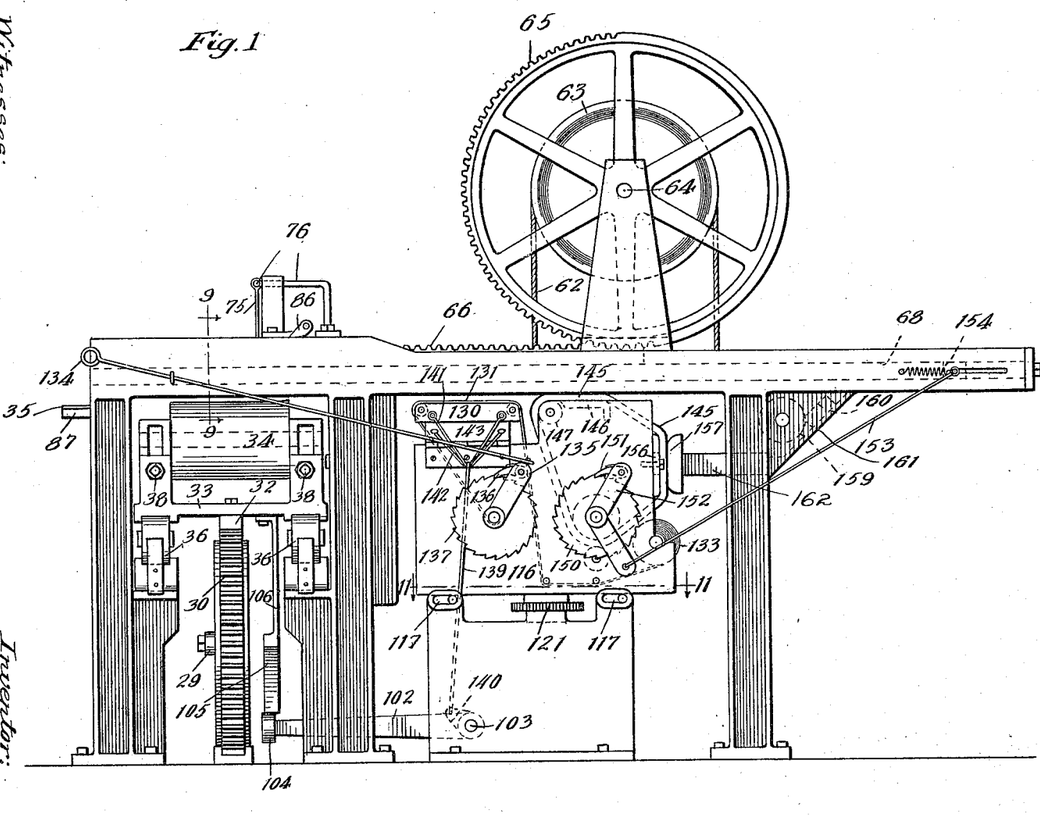
Figure 1 is a side view, on the right, of the entire machine.
Figure 2:
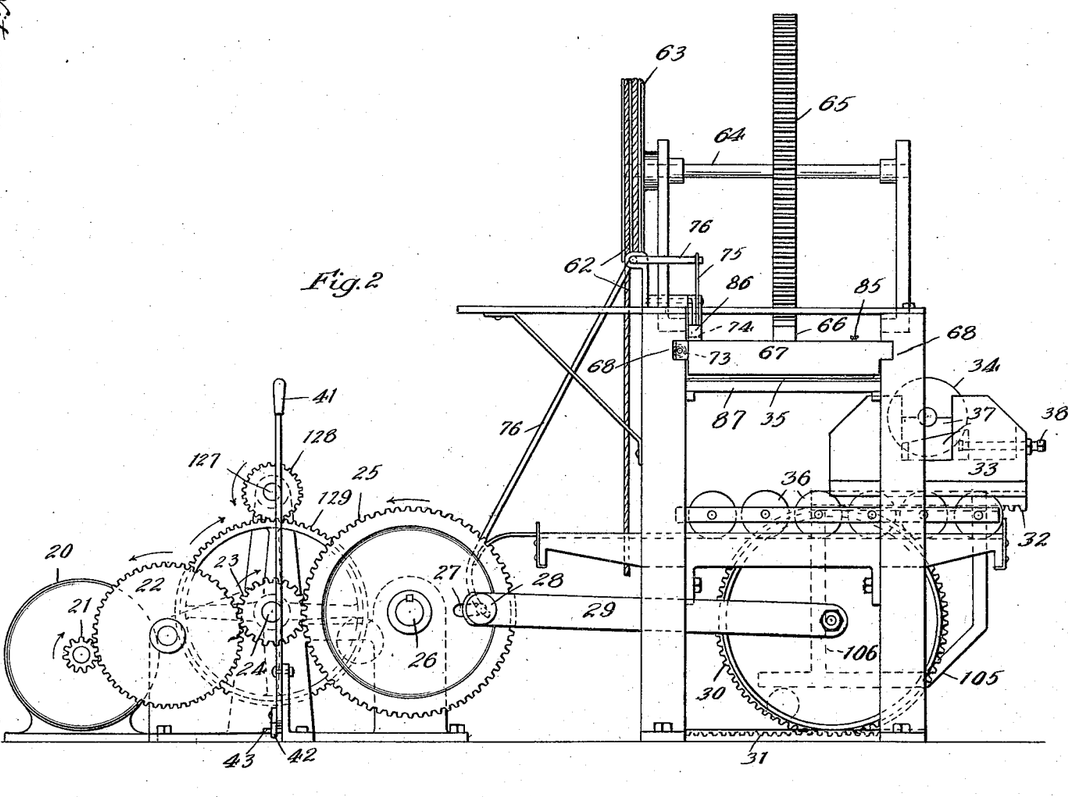
Fig. 2 is a front view of the same.
Figures 3, 14:
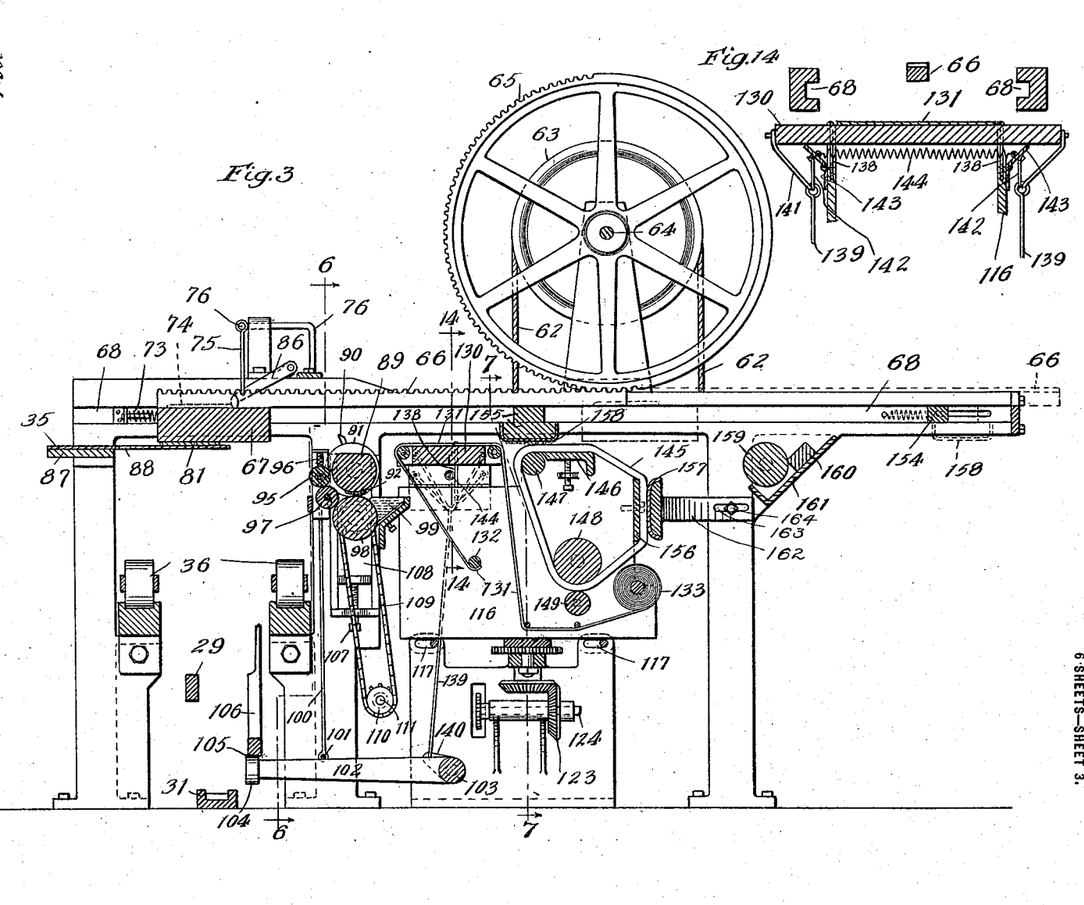
Fig. 3 is a section on line 3—3 of Fig. 4.
Fig. 14 is a section on line 14—14 of Fig. 3.
Figures 4, 5:
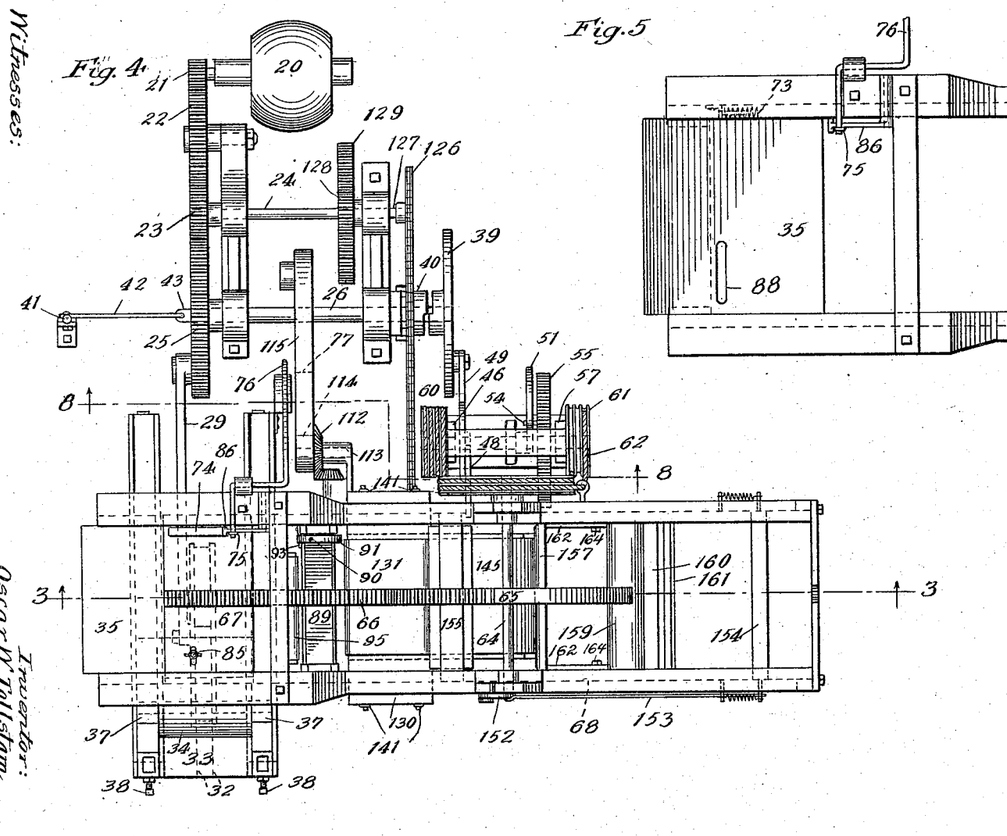
Fig. 4 is a top plan view of the entire machine.
Fig. 5 is an enlarged detail top plan view of the support or platen upon which the material to be printed rests, and of the forward end of the runways on which the bed or "plank" reciprocates.
Figure 6:
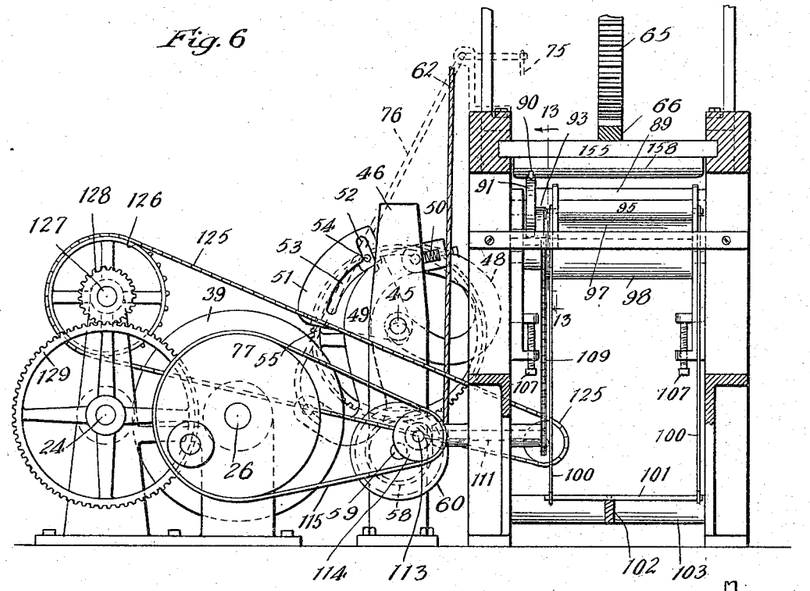
Fig. 6 is a section on line 6—6 of Fig. 3.
Figure 7:
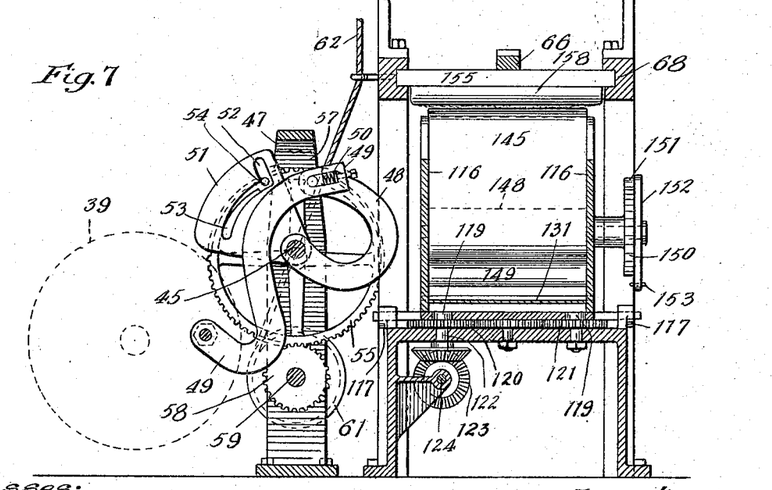
Fig. 7 is a section on line 7—7 of Fig. 3.
Figure 8:
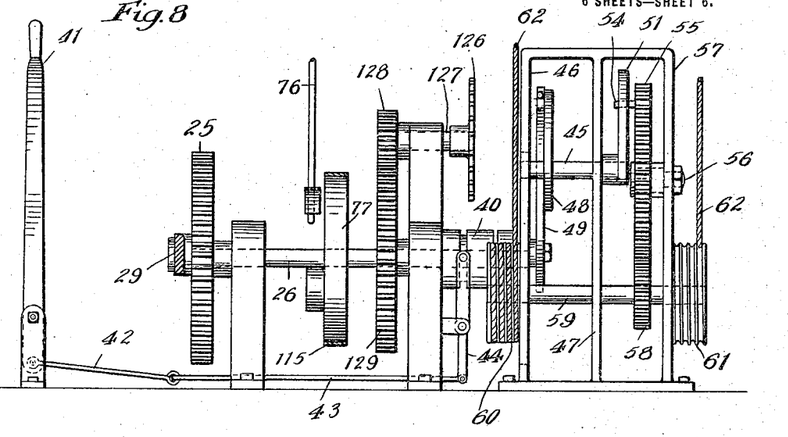
Fig. 8 is a section on line 8—8 of Fig. 4.
Figure 9:
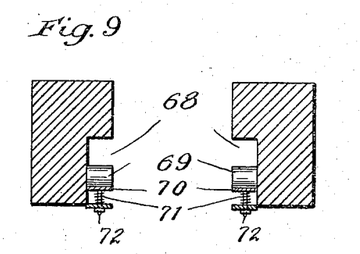
Fig. 9 is a section on line 9—9 of Fig. 1.
Figure 10:
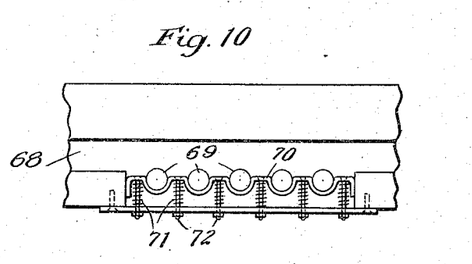
Fig. 10 is an inner elevation of the portion of one of the runway ends shown in section in Fig. 9.
Figure 11:
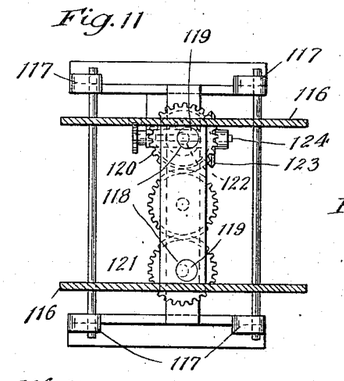
Fig. 11 is a section on line 11—11 of Fig. 1, and shows a detail top plan view of the mechanism, shown in side elevation in Figs. 1 and 3, for imparting an orbital motion to the frame that supports the wiper and the polisher.
Figures 12, 13:
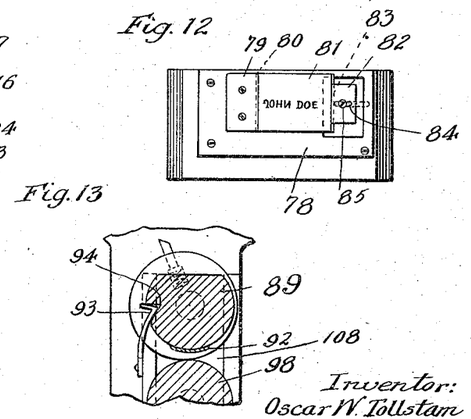
Fig. 12 is a detail underneath view of the bed or plank and its attached plate chucking device.
Fig. 13 is a section on line 13—13 of Fig. 6, showing a detail of the spring detent for checking the rotation of the inking roller.

The rear end of the secondary driving shaft bears freely mounted upon it the circle-plate 39, and just within said plate the clutch sleeve 40 is mounted on and slidingly keyed upon said shaft, so that said clutch sleeve may be thrown into engagement with said circle-plate by means of the hand-operated clutch lever 41 and its connection rods 42, 43 and 44. When said circle-plate is so clutched to said secondary driving shaft, it imparts successive three-quarter oscillations to the rock shaft 45 mounted in the vertical standards 46 and 47, said rock shaft having secured to its forward end the U-shaped link 48 whose free end is adjustably connected with the free end of the S-shaped link 49 that has its other end pivotally mounted on the stud near the periphery of the aforesaid circle-plate. The adjustable spring connection 50 between the free ends of these two links accommodates the shock at the instant of the reversal of the oscillatory movement of the rock-shaft to which the U-shaped link is secured; and the respective peculiar forms of the two said links provides for such mutual clearance of the parts as may permit a maximum oscillation of the rock shaft notwithstanding the linear proximity of said rock shaft to the axis of the aforesaid circle-plate clutched on the secondary driving shaft of the machine. The rear end of the aforesaid rock shaft has rigidly secured to it the segmental rock arm 51, provided with the L-formed slot having a radial portion 52 and an arc portion 53, said slot engaging a stud 54 secured near the periphery of the gear wheel 55 that is freely mounted on the stud shaft 56 borne on the vertical standard 57, said stud shaft having its axial center somewhat below the axial center of the aforesaid segment-bearing rock-shaft. The said gear wheel mounted on this stud shaft meshes with the pinion 58 that is in turn secured on the pulley shaft 59 whose opposite ends bear the pulleys 60 and 61. The said pulleys have respectively secured to them the opposite ends of the pulley cord that passes over, and has its middle secured to, the press bed driving pulley 63 secured on the oscillating shaft 64 upon whose center is secured the press-bed driving gear 65 that meshes with, and effects the reciprocation of, the rack 66, to the forward end of which the press bed or plank 67 is secured. The oscillation of the press bed driving gear and driving pulley is effected by the alternate winding and unwinding of the pulley cord on first one and then the other of the two aforesaid pulleys mounted on the respectively opposite ends of the aforesaid gear-driven pulley-shaft, said pulley shaft being rotated first in one direction and then in the other as the aforesaid stud-bearing gear is oscillated by the oscillating slotted segment. Said segment and other parts are shown in Figs. 6 and 7 in the position they occupy at the instant when the forward throw of the press-bed has just been completed. The next quarter turn of the circle-plate, and resultant quarter turn of the segment-bearing rock shaft, will cause the gear wheel stud to travel idly forward and back through the arc portion of the L-formed slot in the segment, and as the stud comes into contact with the rear wall of the said slot the further movement of the driving parts causes the stud bearing gear to begin its reverse movement, thereby reversing, and effecting the reverse movement of, the pulley-driven press-bed mechanism. And as the said reverse movement is completed, the said stud moves outward into the radial portion of the segment slot and dwells there momentarily at the instant of the rear reversal of the press bed, the forward movement being then effected by the return movement of the segment and the engagement of the gear stud with the forward wall of the radial portion of the segment slot, the said stud escaping from the radial portion of said slot at the instant of commencement of the dwell of the press bed at the forward limit of the latter's movement,—the dwell during which the printing impression, by the aforedescribed reciprocation of the impression frame and roller, takes place.

To the end that any lost motion between the press bed and the runways 68, 68, in which said bed reciprocates, may be properly compensated for during the printing impression period, the inner and lower forward ends of said runways are cut away, for a distance somewhat exceeding the length of the press bed, and provided with the adjustable roller bearings consisting in the series of rollers 69 mounted in the vertically movable corrugated strips 70 supported on the series of springs 71 on the series of upright adjustment bolts 72. As the press bed slides in over this series of spring-supported rollers, it is gradually pressed upward into close contact with the upper treads of the runways, so that no jar or shock results from the subsequent upward pressure exerted by the reciprocating impression roller that effects the printing.

The limit of the forward throw of the press bed is cushioned by the springs 73 secured within the forward ends of the runways. And the press bed is locked against possibility of overrebounding, from said springs, by means of the pivoted detent 86 that engages the inner end of the detent plate 74, on one side of the top of the bed, and is lifted by the link rod 75 and lever rod 76, the lower end of said lever rod being arranged to engage an eccentric stud on the outer face of the pulley wheel 77 on the secondary driving shaft, said stud being timed to engage said lever rod just before the press-bed is to begin its rearward movement.

The underside of the press bed is provided with a removable chuck plate 78 having removably secured to it a fixed retainer plate 79 whose undercut edge 80 is adapted to engage one of the beveled edges of the engraved plate 81 that is to be printed from. The other end of said chuck plate is apertured to accommodate the adjustable retaining plate 82 whose undercut edge 83 is adapted to engage on opposite beveled edge of the aforesaid engraved plate. This adjustable retaining plate is transversely slotted, at 84, and the press bed is correspondingly slotted, so that a considerable adjustment of said retaining plate may be effected by means of the through bolt 85 that removably secures said retaining plate to the bed or plank. This construction greatly facilitates the quick adjustment of copper plates into proper printing position beneath the bed or plank. When engraved steel plates are to be printed from, the entire chuck plate, and the retaining plates, may be dispensed with and the engraved steel plate secured, by through bolts directly to the underface of the bed or plank, the above mentioned adjustment slot having been first filled by a removable filler plug that is adapted to fill said slot and give a uniform solid and smooth face to the under side of the bed. When the chuck-plate is used, the "backing" of paper, that may be required to "bring up" the impression of the engraving, is placed under the chuck-plate, instead of under the engraved plate, so that all distortion of the flat surface of the engraved plate may be obviated.

The platen or support for the paper or card to be printed upon, may be the simple sheet of card-board 35 having its forward end secured to the platform 87. Said platen card-board may be slotted, as at 88, to facilitate the lifting of the paper or card after the printing operation. The paper or card is fastened upon said platen card-board by the use of register pins in the usual manner.

After the press bed commences its rearward throw, the first operation effected by the machine is the inking of the engraved plate that is chucked to the underface of said bed or "plank." This inking is effected by the D-formed ink roller 89 mounted transversely of the path of travel of the press bed. The flat side of said D-formed roller is normally presented upward, except while the press bed is traveling rearward over said roller. As the bed, on its rearward travel, approaches said roller, the rear edge of the bed engages a spring-held stud 90 that projects radially upward from the periphery of a friction disk 91 on one end of said roller. Such engagement of said stud starts the ink roller in rotation, in a backward direction, and the contact of the said friction disk with the under face of the press bed continues the roller in rotation during the rearward travel of the bed over the roller, causing the engraved plate to be inked by contact with the ink-smeared felt counter 92 that is removably attached to the cylindrical surface of the metal body of the roller. At the limit of one rotation, before the press bed makes its forward return, the inking roller is checked, and also held against reverse movement, by the spring catch 93, engaging the detent notch 94 in one end of the metal body of the roller. And the top of the spring stud in the aforesaid friction disk is rearwardly beveled so that the engagement of the front edge of the press bed with said stud, on the return forward movement of the bed, will simply press said stud into its socket without forcing any reverse movement of the inking roller, the said roller being thereby permitted to remain at normal, with the upwardly presented flat face entirely clearing the wiped and polished face of the engraved plate as the bed travels forward into position for receiving the printing impression. The inking counter on the inking roller receives its ink from the small distributing roller 95 that is mounted to move up and down but is normally held, by the springs 96, in contact with the stationary intermediate distributing roller 97 that is in constant rotating contact with the constantly rotated large feed roller 98 that draws ink from the fountain 99. The elevation of the first mentioned or upper distributing roller, to effect the proper inking of the counter on the D-formed inking roller, is effected by the connection rods 100 having their upper ends engaging the respectively opposite ends of said distributing roll and having their lower ends secured, by a pivotal cross-rod 101, to the rock arm 102 that is fastened on the rock shaft 103 and is depressed by the contact of the roller 104, on its free forward end, with the cam-face 105 on the member 106 that projects downward from the under side of the reciprocating impression-roller frame,— this cam face being timed to act, and depress the said rock arm, just as the press bed commences its forward throw, the upper distributing roller being held in rotating contact with the intermediate distributing roller to receive an ink supply, until just as the impression roller completes its leftward stroke and the press bed commences its rearward throw. Both the D-formed inking roller and the large feed roller are adjustable vertically, by means of the adjustment screws 107 bearing upward on the vertically slidable blocks 108 in which said rollers are journaled. The large feed roller, constantly drawing ink from the ink fountain, is kept in rotation by the sprocket chain 109 driven by the sprocket wheel 110 on the miter gear shaft 111, whose miter gear is in turn driven by the larger miter gear 112 secured on the pulley shaft 113 that carries the smaller pulley 114 driven by the belt 115 looped over the large pulley 77 on the secondary driving shaft of the machine.

The wiping and polishing mechanism are mounted in the wiper and polisher frame 116 that is supported in the horizontal bearings 117 and that receives a constant horizontal orbital motion by virtue of the engagement of the two stud holes 118, 118, in the bottom plate of said frame, with the eccentrically mounted stud pins 119, 119, in the respective upper faces of the horizontally rotating pinions 120 and 121, the pinion 121 being driven by the idle pinion intermediate it and the pinion 120, and the pinion 120 being secured on the upper end of the short vertical miter gear shaft 122 whose horizontal miter gear meshes with the vertical miter gear 123 on the short horizontal drive shaft 124 driven by the sprocket chain 125 that leads to the large sprocket 126 on the rear end of the shaft 127 whose forward end bears the pinion 128 meshing with the gear 129 on the rear end of the main drive shaft of the machine.

The wiper mechanism mounted in the wiper and polisher frame consists in a vertically movable, and also vertically adjustable, wiper-plate 130 supporting a wiper cloth 131 whose forward end is secured to and progressively wound upon a feed roller 132, said wiper cloth being progressively drawn off from a roll 133 removably mounted in the lower rear end of the wiper and polisher frame. To obtain a fresh surface of the wiper cloth, for presentation to the inked plate, the operator pulls the hand rod 134 whose lower end is attached to the pawl lever 135 pivoted on one end of the aforesaid feed roller and carrying the pawl 136 that is constantly spring-pressed into engagement with the ratchet wheel 137 also secured to said end of the feed roller. Adjustment of the wiper plate, to effect varying contact of the wiper cloth with the inked plate, is effected by means of the adjusting screws 138. But the considerable downward movement of said wiper plate, to effect the entire clearance of the polished engraved plate during the return forward movement of the press bed, is effected by the connection rods 139, 139, whose lower ends are respectively attached to the short rock arms 140, 140, secured on the respectively opposite ends of the before mentioned rock shaft 103 whose rocking is effected by the reciprocation of the impression-roller frame. The upper ends of these connection rods 139, 139, draw downward upon loops 141 and 142 that are respectively secured to either end of the wiper plate and to the hinged supporting members 143 that support either end of said wiper plate. These hinged supporting members are constantly drawn toward each other, and thereby constantly tend to hold the upper plate in elevated position, by means of springs 144 stretched between said outwardly opening hinged supporting members, the said springs being stretched as the said supporting members are drawn down by the loops 142 and connecting rods 139, such depression of the upper plate, as aforesaid, being for the purpose of effecting an entire clearance of the engraved plate that has been fully inked and wiped and polished when the press bed begins its forward throw toward the position in which said bed receives the printing impression.

The polisher mechanism, mounted in the rear part of the wiper and polisher frame, consists of a continuous belt of specially prepared and dressed cushion felt 145, having its uppermost face constantly supported at the proper level by the upper member of the adjustable polisher plate 146, said upper member being adjustable, to or from the lower member, to accommodate the upper surface of the polisher felt to different thicknesses of engraved plates that may be chucked on the press bed. The upper forward turn of the felt polisher belt passes over the idle roller 147, and the lowermost turn of said belt loops around the large feed roller 148 and is pressed into feeding contact with said roller by the underneath small pressure roller 149. The feed roller is periodically rotated, to bring a fresh surface of the polisher belt uppermost, by means of the ratchet 150, on the outer end of said roller, this ratchet being engaged by the spring pawl 151 mounted on one arm of the bent lever 152. Said bent lever is pivoted, at its center, on the hub of the feed roller, and its lower end is actuated, to effect the pawl and ratchet rotation of the feed roller, by means of the connection rod 153 leading rearward and upward to the spring-pressed slide bar 154 mounted transversely of the path of the rearward end of the travel of the cross bar 155 that is secured under the rear end of the press bed rack bar. The engagement of this cross bar 155 with the aforesaid sliding bar at the rear end of the press bed runways, obviously effects a variously adjustable movement of the polisher belt feed roller just as the press bed completes its rearward throw and before its return throw is commenced. The polisher belt is rearwardly stretched and supported by the horizontally movable and vertically adjustable plate 156, and this plate constantly presses a section of said polisher belt toward an adjustable smearing cushion 157 that is supported on the rear standards of the machine, said cushion being mounted on horizontal arms 162, 162, each slotted at 163 and connected to the adjacent standard by a nutted bolt 164, whereby the cushion may be definitely adjusted to make exactly the required contact with the surface of the polisher belt. This smearing cushion has a cloth facing supported by a cushioning composition, and such cloth surface wipes across a section of the surface of the polisher belt each time the orbital motion of the wiper and polisher frame carries the belt bodily rearward.

To effect a proper application of whiting to the polishing dressed surface of the polisher belt, a soft felt pad 158 is fixed to the under side of the cross bar 155 fixed near the rear end of the press bed rack bar, and this pad wipes across the uppermost surface of the polisher belt, on both the forward and back movement of the press bed rack bar, and is itself wiped across the whiting distributing roller 159 supported just back of the rear standard of the machine, transversely of the rear path of the travel of said pad. Said distributing roller is surfaced with soft felt or cloth and is constantly smeared with whiting by contact with the block of caked whiting 160 resting on the inclined supporting plate 161.

The polisher belt is made of a soft cushion felt that is surface-dressed, and kept moist, by repeated application of an oily pasty medium such as thick printer's ink, consisting in oils mixed and thickened with coloring matter or lamp black, with a subsequent application of a calcined polishing powder such as the whiting heretofore indicated. This peculiarly prepared fabric, manipulated by the constant horizontal orbital motion of the polisher mechanism, and having its polishing face intermittently shifted by the feed devices and its surface intermittently brushed by the smearing cushion and by the whiting pad, acts upon the inked face of the engraved plate to effect as perfect and uniform polishing thereof as could be effected by the hand of the most skilful operator in the usual polishing manipulation, which consists in deftly rubbing the inked face of the plate with the bare hand slightly coated with whiting.

The substitution of such a polishing mechanism and surface-dressed fabric for the bare hand of the operator both facilitates the perfect polishing of the plate and also makes possible the mechanical, instead of manual, performance of the polishing operation and the embodying of such mechanical performance in the automatic action of a machine. The engraved plate is not touched by the hand of the operator after being chucked on the bed of the press, and the complete and entirely automatic performance of the printing operations, including the inking and wiping and polishing and impression functions, without interruption for manual performance of either the polishing or any other of these functions, provides for attaining the highest possible speed in printing from engraved plates and renders the entire work automatically mechanical.

My invention is hereinabove set forth in one particular form of construction, but I do not limit it thereto or to less than all the possible forms in which said invention as hereinafter claimed may be embodied and distinguished from prior devices for like purposes.

I claim:

1. In an engraver's plate press, in combination: coöperating and automatic inking, wiping, polishing and impression mechanisms, and plate-holder mechanism successively presenting the engraved plate to the several aforesaid mechanisms respectively; said polishing mechanism having polishing material supported in transversely rubbing contact with the said moving plate; and said plate-holder mechanism being adapted to sweep the plate first in one direction and then in reverse direction across said transversely rubbing polisher; substantially as specified.

2. In an engraver's plate press, in combination: coöperating and automatic inking, wiping, polishing and impression mechanisms, and plate-holder mechanism successively presenting the engraved plate to the several aforesaid mechanisms respectively; said polishing mechanism having polishing material supported in orbitally rubbing contact with the said moving plate; and said plate-holder mechanism being adapted to sweep the plate first in one direction and then in reverse direction across said orbitally rubbing polisher; substantially as specified.

3. In an engraver's plate press, in combination: coöperating and automatic inking, wiping, polishing and impression mechanisms, and plate-holder mechanism successively presenting the engraved plate to the several aforesaid mechanisms respectively; said polishing mechanism having polishing material adjustably supported in transversely rubbing contact with the said moving plate; and said plate-holder mechanism being adapted to sweep the plate first in one direction and then in reverse direction across said transversely rubbing polisher; substantially as specified.

4. In an engraver's plate press, in combination: coöperating and automatic inking, wiping, polishing and impression mechanisms, and plate-holder mechanism successively presenting the engraved plate to the several aforesaid mechanisms respectively; said polishing mechanism having polishing material supported in transversely rubbing contact with the said moving plate, and having feeding devices to shift the polishing face of the polisher; and said plate-holder mechanism being adapted to sweep the plate first in one direction and then in reverse direction across said transversely rubbing polisher; substantially as specified.

5. In an engraver's plate press, in combination: coöperating and automatic inking, wiping, polishing and impression mechanisms, and plate-holder mechanism successively presenting the engraved plate to the several aforesaid mechanisms respectively; said polishing mechanism having polishing material supported in transversely rubbing contact with the said moving plate, and having means for automatically redressing the polishing face of the polisher; and said plate-holder mechanism being adapted to sweep the plate first in one direction and then in reverse direction across said transversely rubbing polisher; substantially as specified.

6. In an engraver's plate press, in combination: coöperating and automatic inking, wiping, polishing and impression mechanisms, and plate-holder mechanism successively presenting the engraved plate to the several aforesaid mechanisms respectively; said inking mechanism being positioned and arranged to make inking contact with said plate as the latter leaves the impression mechanism, and then to be retracted to clear the wiped and polished plate as the latter returns toward the impression mechanism; said wiping mechanism being positioned and arranged to wipe the inked plate as the latter leaves the inking mechanism, and then to be retracted to clear the polished plate as the latter returns toward the impression mechanism; and said polishing mechanism being positioned and arranged to make transversely rubbing contact with said plate both as the latter leaves the wiping mechanism and as it returns toward the impression mechanism; substantially as specified.

7. In an engraver's plate press, in combination: coöperating and automatic inking, wiping, polishing and impression mechanisms, and plate-holder mechanism having a horizontally reciprocating plate-bed successively presenting the engraved plate to the several aforesaid mechanisms respectively; said inking mechanism being positioned and arranged to make inking contact with said plate as the latter leaves the impression mechanism, and then to be retracted to clear the wiped and polished plate as the latter returns toward the impression mechanism; said wiping mechanism being positioned and arranged to wipe the inked plate as the latter leaves the inking mechanism, and then to be retracted to clear the polished plate as the latter returns toward the impression mechanism; and said polishing mechanism being positioned and arranged to make transversely rubbing contact with said plate both as the latter leaves the wiping mechanism and as it returns toward the impression mechanism; substantially as specified.

8. In an engraver's plate press, in combination: coöperating and automatic inking, wiping, polishing and impression mechanisms, and plate-holder mechanism having a horizontally reciprocating plate-bed downwardly and successively presenting the engraved plate to the several aforesaid mechanisms respectively; said inking mechanism being positioned and arranged to make inking contact with said plate as the latter leaves the impression mechanism, and then to be retracted to clear the wiped and polished plate as the latter returns toward the impression mechanism; said wiping mechanism being positioned and arranged to wipe the inked plate as the latter leaves the inking mechanism, and then to be retracted to clear the polished plate as the latter returns toward the impression mechanism; and said polishing mechanism being positioned and arranged to make transversely rubbing contact with said plate both as the latter leaves the wiping mechanism and as it returns toward the impression mechanism; substantially as specified.

9. In an engraver's plate press, in combination: coöperating and automatic inking, wiping, polishing and impression mechanisms, and plate-holder mechanism successively presenting the engraved plate to the several aforesaid mechanisms respectively; said plate-holder mechanism having an intermittently reciprocating plate-bed adapted to have a positive dwell during the impression operation; said inking mechanism being positioned and arranged to make inking contact with said plate as the latter leaves the impression mechanism, and then to be retracted to clear the wiped and polished plate as the latter returns toward the impression mechanism; said wiping mechanism being positioned and arranged to wipe the inked plate as the latter leaves the inking mechanism, and then to be retracted to clear the polished plate as the latter returns toward the impression mechanism; and said polishing mechanism being positioned and arranged to make transversely rubbing contact with said plate both as the latter leaves the wiping mechanism and as it returns toward the impression mechanism; substantially as specified.

10. In an engraver's plate press, in combination: coöperating and automatic inking, wiping, polishing and impression mechanisms, and plate-holder mechanism successively presenting the engraved plate to the several aforesaid mechanisms respectively; said plate-holder mechanism having an intermittently reciprocating plate-bed adapted to have a positive dwell during the impression operation; said impression mechanism having an impression roller reciprocating transversely of the path of travel of the plate-bed; said inking mechanism being positioned and arranged to make inking contact with said plate as the latter leaves the impression mechanism, and then to be retracted to clear the wiped and polished plate as the latter returns toward the impression mechanism; said wiping mechanism being positioned and arranged to wipe the inked plate as the latter leaves the inking mechanism, and then to be retracted to clear the polished plate as the latter returns toward the impression mechanism; and said polishing mechanism being positioned and arranged to make transversely rubbing contact with said plate both as the latter leaves the wiping mechanism and as it returns toward the impression mechanism; substantially as specified.

In testimony whereof, I have hereunto set my hand in the presence of two subscribing witnesses, this 11th day of July, 1908.

OSCAR W. TOLLSTAM.

Witnesses:
 HENRY LOVE CLARKE,
 J. H. BERG.

Copies of this patent may be obtained for five cents each, by addressing the "Commissioner of Patents, Washington, D. C."